United States Patent [19]

Schmid et al.

[11] Patent Number: 5,501,731
[45] Date of Patent: Mar. 26, 1996

[54] CARBON-CONTAINING LUSTER PIGMENTS

[75] Inventors: Raimund Schmid, Neustadt; Norbert Mronga, Dossenheim; Werner Ostertag, Gruenstadt; Helmut Schmidt, Osthofen, all of Germany

[73] Assignee: BASF Aktiengesellschaft, Ludwigshafen, Germany

[21] Appl. No.: 266,384

[22] Filed: Jun. 27, 1994

[30] Foreign Application Priority Data

Jul. 15, 1993 [DE] Germany ............................ 43 23 744.4

[51] Int. Cl.$^6$ ................................................. C04B 14/20
[52] U.S. Cl. ...................... 106/417; 106/415; 106/416; 106/439; 106/442; 106/450; 106/456; 106/459
[58] Field of Search ............................ 106/415, 416, 106/417, 439, 459, 456, 450, 442

[56] References Cited

U.S. PATENT DOCUMENTS

| | | | |
|---|---|---|---|
| 3,087,827 | 4/1963 | Klenke, Jr. et al. | 106/417 |
| 3,107,173 | 10/1963 | Klenke, Jr. | 106/417 |
| 4,076,551 | 2/1978 | Bernhard et al. | 106/417 |
| 5,271,771 | 12/1993 | Franz et al. | 106/474 |
| 5,277,711 | 1/1994 | Schmidt et al. | 106/404 |
| 5,286,291 | 2/1994 | Bernhardt et al. | 106/417 |
| 5,302,199 | 4/1994 | Prengel et al. | 106/417 |
| 5,364,467 | 11/1994 | Schmid et al. | 106/404 |

FOREIGN PATENT DOCUMENTS

| | | |
|---|---|---|
| 0499864 | 8/1992 | European Pat. Off. . |
| 4104846 | 8/1992 | Germany . |
| 4141069 | 6/1993 | Germany . |
| 4241753 | 6/1994 | Germany . |
| WO93/12182 | 6/1993 | WIPO . |

*Primary Examiner*—Mark L. Bell
*Assistant Examiner*—Scott L. Hertzog
*Attorney, Agent, or Firm*—Oblon, Spivak, McClelland, Maier & Neustadt

[57] ABSTRACT

Luster pigments comprising coated, plateletlike, silicatic substrates wherein the coating comprises a layer consisting essentially of carbon and aluminum oxide, chromium oxide, cerium oxide, zirconium oxide, antimony oxide or mixtures thereof, are obtainable by applying carbon-containing compounds of the metals aluminum, chromium, cerium, zirconium, antimony or mixtures thereof with or without further carbon-containing compounds of the molecular formula $(CH_2O)_n$, where n is from 1 to 6 for one monomeric unit, to the substrate particles and then thermally decomposing the carbon-containing compounds on the surface of the substrate particles under oxygen-excluding conditions.

3 Claims, No Drawings

CARBON-CONTAINING LUSTER PIGMENTS

The present invention relates to novel luster pigments comprising coated, platelet like, silicatic substrates wherein the coating comprises a layer consisting essentially of carbon and aluminum oxide, chromium oxide, cerium oxide, zirconium oxide, antimony oxide or mixtures thereof, obtainable by applying carbon-containing compounds of the metals aluminum, chromium, cerium, zirconium, antimony or mixtures thereof with or without further carbon-containing compounds of the molecular formula $(CH_2O)_n$, where n is from 1 to 6 for one monomeric unit, to the substrate particles and then thermally decomposing the carbon-containing compounds on the surface of the substrate particles under oxygen-excluding conditions.

The invention also relates to the production of these luster pigments and to their use for coloring paints, printing inks, plastics, glasses and ceramic products.

Luster or effect pigments are increasingly used in many sectors of industry, for example in automotive coatings, decorative coatings, plastics pigmentation, printing inks, in particular security inks, paints and cosmetics.

Their optical effect is based on directional reflection of light at predominantly sheetlike, oriented, metallic or strongly refractive pigment particles. Depending on the composition of the pigment particles, they are also known as metallic effect pigments (e.g. aluminum, zinc or copper flakes) or pearl luster pigments (e.g. highly refractive, transparent, plateletlike metal oxides such as bismuth oxychloride, or silicatic substrates such as muscovite, phlogopite, biotite, talc or glass coated with highly refractive metal oxides such as titanium dioxide or zirconium dioxide).

In addition there are a number of combination pigments, in which the abovementioned pigments are coated with further, in particular colored, highly refractive metal oxides such as chromium oxide and in particular iron oxide. Interference, reflection and absorption phenomena result in a multiplicity of angle-dependent color and lightness effects depending on the thickness of the metal oxide layer. These pigments are therefore also termed interference pigments.

It is known that the delicate interference and mass tone colors of pearl luster pigments, in particular, can be distinctly strengthened by application of non-selectively absorbing materials such as carbon. The carbon can be applied not only in the form of layers consisting essentially of carbon only but also in the form of layers containing metal oxide in addition to carbon.

U.S. Pat. No. 3,087,827 and 3,107,173 and DE-A-41 41 069 (CA 2,123,783) describe the coating of mica pigments with a layer consisting essentially of carbon. In the first two cases mentioned the coating is effected by pyrolysis of low or nil oxygen content hydrocarbons in the presence of the mica pigments and under oxygen-excluding conditions, while in the last case oxygen-rich hydrocarbons, in particular sugars, are applied to the substrate particles and then thermally decomposed. This produces particularly smooth, filmlike layers. However, these pigments, coated with a pure layer of carbon, are not sufficiently lightfast for many applications, in particular at low carbon contents (<1% by weight, based on the ready-prepared pigment).

DE-A-25 57 796 (U.S. Pat. No. 4,076,551) and 41 04 846 concern the formation of carbon-containing metal oxide layers by coprecipitation of carbon black pigments and metal hydroxides from an aqueous medium onto pearl luster pigments and subsequent calcination under oxygen-excluding conditions. The disadvantage with this procedure is that the carbon black particles disperse only slowly and then only with the aid of auxiliaries in the aqueous phase. The formation of carbon black agglomerates is thus difficult to prevent and the incorporation of such agglomerates in the metal oxide layers entails reduced luster.

DE-A-41 25 134, (U.S. Pat. No. 5,271,771) finally, describes the deposition of carbon layers by pyrolysis of volatile hydrocarbons or by precipitation of fatty acids and subsequent pyrolysis and also the formation of layers which contain carbon and calcium oxide or iron oxide by precipitation of calcium stearate or iron oxalate and subsequent pyrolysis. Since the thermal treatment is carried out under oxygenexcluding conditions, metal oxides in or already on the substrate are to be at least partially reduced.

It is an object of the present invention to provide carbon-containing luster pigments having good application properties, including in particular sufficient lightfastness.

We have found that this object is achieved by the luster pigments defined at the beginning.

The invention further provides the corresponding process for preparing these luster pigments.

The invention further provides for the use of these pigments for coloring paints, printing inks, plastics, glasses and ceramic products.

Suitable plateletlike silicatic substrates for the luster pigments of the invention are in particular light-colored or white micas, and flakes of preferably wet-ground muscovite are particularly preferred. It is of course also possible to use other natural micas, such as phlogopite and biotite, artificial micas, and talc and glass flakes.

The silicatic substrate particles are preferably already coated with a layer of highly refractive metal oxides such as titanium, zirconium, tin, aluminum, silicon or zinc oxide, bismuth oxychloride or mixtures thereof. A coating of zirconium dioxide is preferred and a coating of titanium dioxide is particularly preferred.

These singly coated pigments are generally knowns see for example DE-C-14 67 468, EP-A-45 851, DE-A-32 37 264 and DE-A-36 17 430. Metal oxide-coated mica platelets are also commercially available under the names Iriodin® (E. Merck, Darmstadt), Flonac® (Kemira Oy, Pori, Finland) and Mearlin® (Mearl Corporation, New York).

The size of the substrate particles is not critical per se and can be adapted to the particular use. Generally, the particles have largest diameters from about 1 to 200 μm, in particular from about 5 to 100 μm, and thicknesses from about 0.1 to 5 μm, in particular about 0.5 μm.

In the luster pigments of the invention, the substrate particles which preferably already have a coating of a highly refractive metal oxide are coated with a further layer which contains not only carbon but also aluminum, chromium, cerium, zirconium and/or antimony oxide. Preferred metal oxides are aluminum oxide and chromium oxide and also mixtures thereof.

The carbon and metal oxide-containing layers of the invention can advantageously be obtained by application of carbon-containing compounds of said metals with or without further carbon-containing compounds which have the molecular formula $(CH_2O)_n$ (n: 1–6 for a monomeric unit) to the substrate particles and subsequent thermal decomposition on the surface of the substrate particles under oxygen-excluding conditions.

Suitable carbon-containing metal compounds are those compounds which are soluble in an aqueous medium in the presence or absence of organic acids and in which the carbon-containing moiety is bonded to the metal via oxygen atoms.

Of particular suitability are the metal salts of monocarboxylic acids such as in particular formates and acetates and also lactates, oleates and stearates. Of very particular suitability are the metal acetylacetonates.

To enhance the solubility of the metal compounds in the aqueous phase it is possible to add organic acids such as formic and acetic acid.

It is also possible to use solutions of freshly precipitated metal hydroxides, for example in formic or acetic acid or higher homologs, as starting compounds.

Selected examples of preferred carbon-containing metal compounds are aluminum acetate, chromium(III) acetate and formate, cerium acetylacetonate, zirconium acetylacetonate, antimony acetate and in particular aluminum and chromium(III) acetylacetonate.

If the metal formates are used, further carbon-containing compounds have to be added in order that not only metal oxide but also carbon-containing coatings may be prepared.

Of particular suitability are the compounds of the molecular formula $(CH_2O)_n$ known from DE-A-41 41 069. n is generally from 1 to 6, preferably 5 or 6, for one monomeric unit. These compounds are preferably low molecular weight sugars such as glucose and dextrose, but it is also possible to use higher molecular weight sugars such as starch and polymeric compounds such as polyoxymethylene.

The addition of these carbohydrates can also be advantageous when carbon-containing metal compounds other than the formates are used in order that the carbon content of the layer to be applied may be increased. Otherwise the choice of carbon-containing metal compound also determines the mixing ratio of carbon to metal in the ready-prepared pigment.

Generally the pigments of the invention contain from 0.05 to 10, preferably from 0.1 to 5, particularly preferably from 0.1 to 1, and very particularly preferably from 0.1 to 0.5, % by weight of carbon.

These ranges also apply to the metals present in the carbon-containing layer of the pigments.

The thickness of the carbon and metal oxide-containing layer is generally from 1 to 20, preferably from 1 to 10, nm.

The carbon-containing luster pigments are advantageously prepared according to the invention by dispersing the substrate particles to be coated in an aqueous solution of the carbon-containing metal compound with or without the carbohydrate and the organic acid and then evaporating the solvent (water or a water-acid mixture). The removal of the solvent and hence the deposition of the carbon-containing metal compound with or without the carbohydrate on the substrate particles is preferably carried out in a spray dryer.

The coated substrates are then heated to thermally decompose the carbon-containing compounds to metal oxide and carbon and also gaseous decomposition products under oxygen-excluding conditions and preferably under an inert gas at generally from 150° to 1000° C., preferably from 250° to 900° C., particularly preferably from 400° to 800° C.

This calcination generally takes from 0.5 to 3 h. The reaction temperature depends on the metal compound used. The thermal decomposition of chromium(III) acetylacetonate starts for example at 170° C., while that of aluminum acetylacetonate starts at as low as 140° C.

It is of particular advantage that chromium(III) acetylacetonate markedly sublimes before the melting point is reached and consequently the coating with the decomposition products takes place from the gas phase, which is why very smooth coatings are obtained.

Especially at the higher temperatures mentioned an at least partial reduction of the metal oxide by carbon or by the gaseous species formed by decomposition cannot be ruled out completely. However, reduction can be substantially ruled out in the preferred temperature range.

The process of the invention makes it possible to prepare carbon-containing luster pigments having excellent application properties, including in particular improved lightfastness.

The luster pigments of the invention are further notable for the high quality of the carbon-containing layer, in particular its filmlike character and its excellent adhesion.

They are advantageous for many purposes, such as the coloring of paints, printing inks, plastics, glasses, ceramic products and decorative cosmetic preparations. They are of particular interest for the preparation of security printing inks and hence for the production of forgery proof, in particular difficult-to-copy or uncopiable, documents described in DE-A-42 41 753, (U.S. Pat. No. 5,364,467) an earlier patent document which was unpublished at the priority date of the present invention. Of particular suitability for this are pigments having a carbon content of $\leq 0.5\%$ by weight, which exhibit a marked color flop on application to white paper.

EXAMPLES

To assess their lightfastness, the pigments of the invention were incorporated not only into paints but also into screen printing inks and, respectively, drawn down and printed.

Paint preparation was by stirring in each case 0.4 g of pigment into 3.6 g of a polyester varnish having a solids content of 21% by weight and dispersing in a Red Devil for two minutes. The paint pigmented in this way was drawn down on white cardboard with a draw bar in a wet film thickness of 160 µm.

The screen printing inks were prepared by stirring in each case 5 g of pigment into 95 g of a binder solution based on copolymers of vinyl chloride and vinyl isobutyl ether (Laroflex® M45, BASF). The screen printing ink obtained was applied with a commercial screen printing machine (screen mesh size 112 µm) to a coated, white, $TiO_2$-coated paper in a thickness of 45 µm and air dried.

The drawdowns and prints obtained were irradiated in a Sun Tester with a xenon lamp for 50, 100 and 150 h.

EXAMPLE 1

To a solution of 1 g of chromium(III) acetylacetonate in 200 ml of water and 40 ml of glacial acetic acid were added 99 g of a $TiO_2$-coated mica pigment having a purple interference color (Iriodin® 219 rutile pearl purple; Merck). The solvent was evaporated by spraying. The dried pigment contained 0.19% by weight of chromium and 0.86% by weight of carbon.

The pigment was then heated under nitrogen at 700° C. for 2 h.

The purple pigment obtained contained 0.12% by weight of chromium and 0.13% by weight of carbon. Applied as a paint or as a printing ink, no noticeable change had occurred after 150 h of irradiation.

Example 2

The method of Example 1 was followed to coat 190.0 g of the same mica pigment using a solution of 4.1 g of chromium(III) formate and 5 g of dextrose in 600 ml of water. The dried pigment contained 0.5% by weight of chromium and 1% by weight of carbon.

The purple, calcined pigment contained 0.42% by weight of chromium and 0.28% by weight of carbon. In the applied state there was again no noticeable change after 150 h of irradiation.

We claim:

1. A process for producing luster pigments which comprises applying one or more carbon-containing compounds selected from the group consisting of the metals aluminum, chromium, cerium, zirconium and mixtures thereof, wherein the carbon-containing compounds are selected from the group consisting of acetylacetonates, formates, acetates and lactates, with or without one or more further carbon-containing compounds selected from the group consisting of low and high molecular weight sugars and polyoxymethylene, to platelet-shaped silicatic substrate particles and then thermally decomposing the carbon-containing compounds on the surface of the substrate particles under oxygen-excluding conditions at a temperature which substantially prevents reduction of the oxides of said metals.

2. The process as claimed in claim 1, wherein the metal of the metal oxides and of the carbon-containing compounds is selected from the group consisting of aluminum, chromium, zirconium and mixtures thereof.

3. The process as claimed in claim 1, wherein said temperature is 150° C. to 800° C.

* * * * *